(No Model.)

B. JENNINGS.
PNEUMATIC CLUTCH.

No. 467,288. Patented Jan. 19, 1892.

Witnesses:

Inventor,
Byron Jennings

UNITED STATES PATENT OFFICE.

BYRON JENNINGS, OF SAN JOSÉ, ASSIGNOR OF ONE-HALF TO JAMES BRUSIE, OF OAKLAND, CALIFORNIA.

PNEUMATIC CLUTCH.

SPECIFICATION forming part of Letters Patent No. 467,288, dated January 19, 1892.

Application filed May 6, 1891. Serial No. 391,815. (No model.)

*To all whom it may concern:*

Be it known that I, BYRON JENNINGS, a citizen of the United States, residing at San José, Santa Clara county, State of California, have invented an Improvement in Pneumatic Clutches; and I hereby declare the following to be a full, clear, and exact description of the same.

My invention relates to an improved clutch, which is especially designed to be used upon rotary machinery, in which one portion is to be kept constantly running, while the other portion is subject to stops without arresting the motion of the other portion.

It consists of a pneumatically-expansible tube or collar fitting between the adjacent faces of the two portions of the machinery, so that when in its normal condition and unexpanded it allows one portion to turn without communicating motion to the other, but when expanded it produces such frictional contact between these adjacent faces that motion is communicated from the constantly-moving part of the other.

Figure 1:
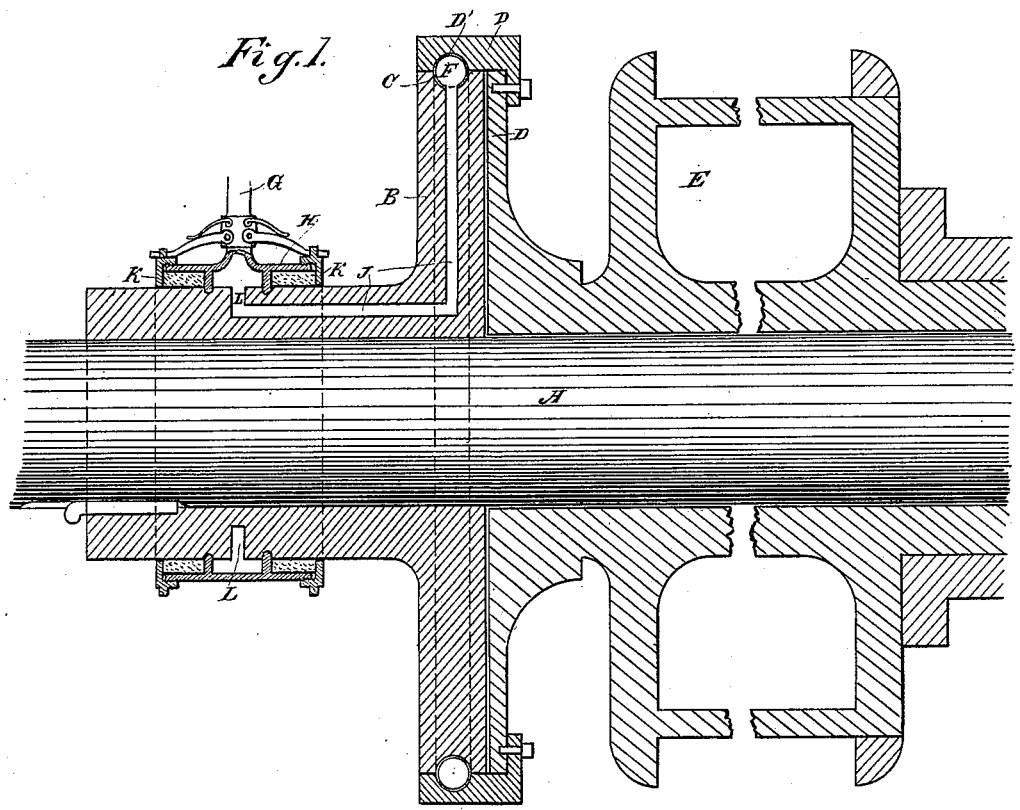
Figure 2:
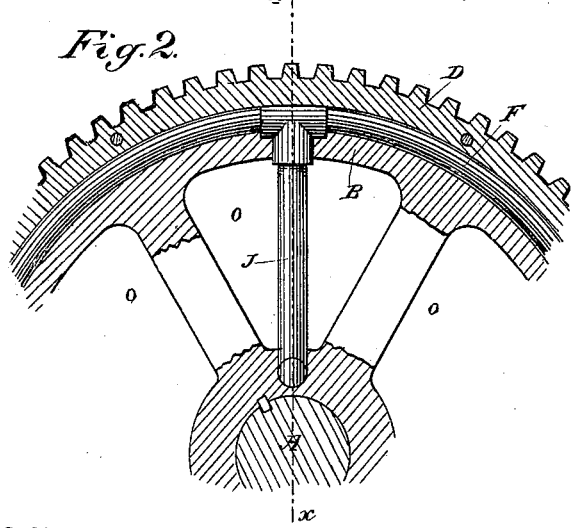
Figure 3:
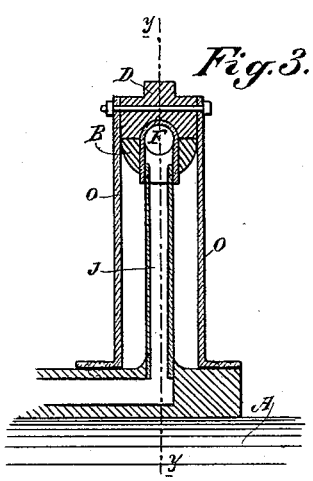

Referring to the accompanying drawings for a more complete explanation of my invention, Figure 1 is a vertical section through my device as applied to an electric motor. Fig. 2 is a cross-section on line $y$ $y$, Fig. 3, showing it when used as a cog-wheel. Fig. 3 is a section on line $x$ $x$ of Fig. 2.

In Fig. 1 I have shown my device as applied between an electric motor and the mechanism which communicates the motion of the motor to the other machinery which it is desired to propel.

The weight of an operative electrical motor is very considerable, and when employed to propel cars or other machinery where frequent stops are to be made the power lost in constantly stopping and starting the motor is very considerable. For this reason it is desirable to allow the motor when once started to run continuously and to provide an intermediate means for stopping the machinery without stopping the motor.

A is a shaft having fixed upon it the wheels or other machinery which it is desired to drive, and B is one portion of the clutch mechanism which is keyed to the shaft. In the present case this is shown in the form of a disk having a smooth groove or channel turned in its periphery, as shown at C. The other portion of the clutch D is connected and rotates with the motor, which is illustrated at E, this motor being of any desired form or construction and having no material bearing upon my invention except that it furnishes the necessary power to be communicated to the shaft A. The outer portion of D extends over the periphery of B and has a corresponding groove or channel D' made in it standing opposite to the groove C, which is made in the portion B of the clutch. This groove or channel is of sufficient diameter to admit a flexible elastic tube F, which may be made of any suitable material. In my experiments I have made it of rubber molded to the proper form and having a sufficient thickness to withstand the necessary tension and pressure. The ends of this tube are suitably connected together, so as to make it practically endless, and when not expanded by air-pressure it will allow the moving part of the clutch to move freely over it, itself lying in that portion which is stationary, and the friction between the moving portion of the clutch and the surface of the tube is comparatively nothing.

G is a pipe leading from a source of supply, where air or other gas or medium is stored or supplied under pressure, and by opening a suitable cock or valve this air or medium under pressure is admitted to the interior of the expansible tube. A sufficient pressure is given to expand the tube, so as to make it fit tightly in the groove or channel between the outer and inner portions of the clutch, and when this is done the motion of one part of the clutch will be communicated to the other.

The two parts of the clutch may be made of any suitable material. I have found that iron or steel with a perfectly smooth and polished groove or channel is very effective, and the friction between the exterior of a rubber tube and the metal is so great that almost any amount of power may be communicated with little or no slippage.

In order to connect the conveying-pipe G with the clutch, various devices may be employed. In the present case I have shown a trunnion H in the form of a loose collar and fitting the exterior of a hub projecting from the stationary portion of the clutch. This hub has a groove or channel L made around it beneath the collar, and the conducting-tube is connected with the collar, so that the air or medium under pressure is admitted directly into this channel through the collar. From this channel an opening or passage J leads through the body of the portion B of the clutch and connects with the expansible tube. In order to prevent leakage around the ends of the collar or trunnion H, I employ packing-boxes K at each end, by which a sufficiently tight joint may always be maintained.

In Figs. 2 and 3 I have shown the exterior portion of the clutch provided with a toothed gear, through which power may be transmitted. In this case the device, instead of being in the form of a disk, has arms or spokes like a wheel, and in order to prevent the entrance of dust I have shown disks or plates O, the outer edges of which are secured to the outer rim or geared portion D of the clutch. The inner edges are so formed as to bear upon the shaft A and make a movable but close joint, and at the same time the disks O serve to support the outer rim when it is not held in contact with the inner portion by the expansion of the tube.

Having thus described my invention, what I claim as new, and desire to secure by Letters Patent, is—

1. A clutch mechanism consisting of a disk fixed to the shaft to be moved and having a peripheral groove or channel and a second disk connected with the motor, having a flange overlapping the periphery of the first disk and a corresponding groove made in its inner surface, in combination with an expansible tube fitting the groove or channel, and a connecting tube or pipe whereby air may be admitted to the expansible tube and force the latter to bind the two parts of the clutch together or exhausted therefrom, so as to allow one part of the clutch to turn independent of the other, substantially as herein described.

2. The two-part clutch, one member of which is connected with the driving and the other with the driven part, grooves made in the adjacent meeting faces of the two parts of the clutch, an expansible tube fitting said groove, a passage and supply-pipe by which a medium under pressure may be admitted to the tube, and a movable joint between the stationary pipe and the passage in the movable clutch, substantially as herein described.

3. A clutch mechanism consisting of the outer and inner grooved independent sections concentric with the shaft, the interposed expansible tube fitting the grooves, and a means by which it may be supplied with a medium under pressure, in combination with disks the outer edges of which are fixed to the outer part of the clutch and the inner edges form a loose dust-tight joint with the shaft, substantially as herein described.

In witness whereof I have hereunto set my hand.

BYRON JENNINGS.

Witnesses:
S. H. NOURSE,
J. A. BAYLESS.